United States Patent [19]

Morishige et al.

[11] Patent Number: 5,042,328

[45] Date of Patent: Aug. 27, 1991

[54] HYDRAULIC TRANSMISSION CONTROL SYSTEM

[75] Inventors: Chitoshi Morishige; Tomoo Sawasaki, both of Hiroshima, Japan

[73] Assignee: Mazda Motor Corporation, Hiroshima, Japan

[21] Appl. No.: 398,601

[22] Filed: Aug. 25, 1989

[30] Foreign Application Priority Data

Aug. 25, 1988 [JP] Japan .................. 63-211728

[51] Int. Cl.$^5$ .............................................. B60K 41/14
[52] U.S. Cl. ......................................... 74/866; 74/844; 74/867
[58] Field of Search ................... 74/866, 867, 844, 857

[56] References Cited

U.S. PATENT DOCUMENTS

| | | | |
|---|---|---|---|
| 4,565,110 | 1/1986 | Ito | 74/867 X |
| 4,595,035 | 6/1986 | Warrick | 251/129.14 X |
| 4,628,773 | 12/1986 | Itoh et al. | 74/867 |
| 4,779,489 | 10/1988 | Haley | 74/844 |
| 4,858,496 | 8/1989 | Iwatsuki et al. | 74/863 |

FOREIGN PATENT DOCUMENTS

| | | | |
|---|---|---|---|
| 0009759 | 4/1980 | European Pat. Off. | 74/866 |
| 0120687 | 10/1984 | European Pat. Off. | 74/866 |
| 2301618 | 7/1973 | Fed. Rep. of Germany | 74/866 |
| 2338122 | 2/1975 | Fed. Rep. of Germany | 74/866 |
| 7519959 | 2/1977 | France | 74/866 |
| 62-4958 | 1/1987 | Japan . | |

Primary Examiner—Allan D. Herrmann
Assistant Examiner—Benjamin Levi
Attorney, Agent, or Firm—Fleit, Jacobson, Cohn, Price, Holman & Stern

[57] ABSTRACT

A hydraulic control system for controlling a transmission of an automotive vehicle has a hydraulic pump driven by an engine to deliver a line pressure and a regulator valve for regulating the line pressure according to a pilot pressure applied thereto. To change the pilot pressure so as to regulate the line pressure to a desired pressure, a duty solenoid valve is operated at a proper duty rate with a steady signal. The steady signal for operating the duty solenoid valve at the desired duty rate is provided at a frequency which is changed according to operating conditions of the automotive vehicle.

10 Claims, 9 Drawing Sheets

HYDRAULIC TRANSMISSION CONTROL SYSTEM

BACKGROUND OF THE INVENTION

The present invention relates to a hydraulic control system for a transmission of an automotive vehicle.

Automatic transmissions generally used in automotive vehicles comprise a torque converter and a transmission gearset which automatically shifts itself to a desired gear range by selectively actuating a plurality of frictional coupling elements.

One known type of automatic transmission is a steplessly variable transmission having a belt-pulley transmission mechanism which comprises a pair of, or primary and secondary, pulleys variable in pitch or effective diameter, and an endless belt rotationally coupling the primary and secondary pulleys together. The primary pulley is connected, either directly or indirectly, to an engine output, and the secondary pulley is connected to a drive line. The primary and secondary pulleys complementarily change in effective diameter to steplessly vary the ratio of transmission of the belt-pulley transmission mechanism. Such a steplessly variable transmission is known from, for example, Japanese Patent Publication No.62-4958.

A hydraulic control circuit is most commonly used to selectively actuate the frictional coupling elements of the automatic transmission, change the primary and secondary pulleys in effective diameter, and change tension of the endless belt of the steplessly variable transmission. The hydraulic control circuit controls a regulating valve to adjust hydraulic pressure from a hydraulic pump to a certain line pressure. The adjusted line pressure is delivered to hydraulic actuators for the frictional coupling elements of the automatic transmission, or to hydraulic actuators for changing the effective diameter of the pulleys of the steplessly variable transmission, through various valves. The line pressure is increasingly or decreasingly changed so as to control the capacity of torque transmission of the frictional coupling elements, or of the pulleys, correspondingly to the output of engine and the ratio of transmission.

In recent years, it has become popular to use a duty solenoid valve, which alternately opens and closes at repeated short time intervals, for regulating a line pressure of the regulating valve. The duty solenoid valve is driven or actuated at a duty rate, i.e., the ratio of opening time to one cycle of open-to-close time, so as to regulate a pilot pressure delivered to the regulating valve, thereby correspondingly creating a desired line pressure.

Because of the periodic opening and closing, the duty solenoid valve causes a pilot pressure applied to the regulating valve, and hence a regulated line pressure delivered from the regulator valve, to pulsate. Pressure pulsations have adverse effects on controlling the transmission of torque and the ratio of transmission of the frictional coupling elements of the automatic transmission or the belt-pulley transmission mechanism of the steplessly variable transmission.

To avoid adverse effects of pressure pulsations, it is well known to operate, or open and close, the duty solenoid valve at short intervals. That is, the duty solenoid valve is operated by an operating signal provided at a high frequency. However, this results in a deterioration of durability, or in extreme cases, a decline in reliability, of the duty solenoid valve.

SUMMARY OF THE INVENTION

It is, therefore, a primary object of the present invention to provide a hydraulic control system for a transmission of an automobile vehicle in which pressure pulsations caused by periodic opening and closing action of a duty solenoid valve are suppressed.

It is another object of the present invention to provide a hydraulic control system for a transmission of an automobile vehicle which operates a duty solenoid valve with a considerable improvement with regard to durability.

These objects are achieved in the present hydraulic control system for a transmission of an automotive vehicle. The hydraulic control system has a hydraulic pump driven by an engine and a regulator valve for regulating a line pressure from the hydraulic pump and delivered to actuators for the transmission according to a pilot pressure applied thereto. A duty solenoid valve is operated at a duty rate so as to regulate a pilot pressure delivered to the regulator valve to a desired line pressure. An operating signal for the duty solenoid valve at the duty rate is provided on a high or a low frequency assigned in accordance with operating conditions of the automotive vehicle.

To assign a desired frequency, i.e., a high or low frequency operating conditions of the automotive vehicle are divided into a plurality of zones based on engine speeds or desired line pressures. The duty rate or the desired line pressure is desirably changed according to the temperature of hydraulic fluid in the hydraulic control system. When the desired line pressure or the engine speed is high, the duty solenoid valve is driven with a steady signal provided at a high frequency, such as 100 Hz so as to suppress pulsations in pilot pressure applied to the regulator valve or line pressure regulated by the regulator valve. On the other hand, when the desired line pressure or the engine speed is not so high, a frequency at which a steady signal is provided for driving the duty solenoid valve is changed so as to be low, such as 33 Hz, so that the deterioration in durability of the duty solenoid valve is effectively suppressed.

BRIEF DESCRIPTION OF THE DRAWINGS

The above and other objects and features of the present invention will become apparent to those skilled in the art from the following detailed description of the preferred embodiments when taken in conjunction with the accompanying drawings, in which.

DETAILED DESCRIPTION OF THE PREFERRED EMBODIMENT

Parts which do not form part of, or cooperate directly with, the invention and parts which are purely of conventional construction will not be described in detail. It is to be understood that parts not specifically shown or described can take various forms well known to those skilled in the automotive vehicle transmission art.

Figure 1:
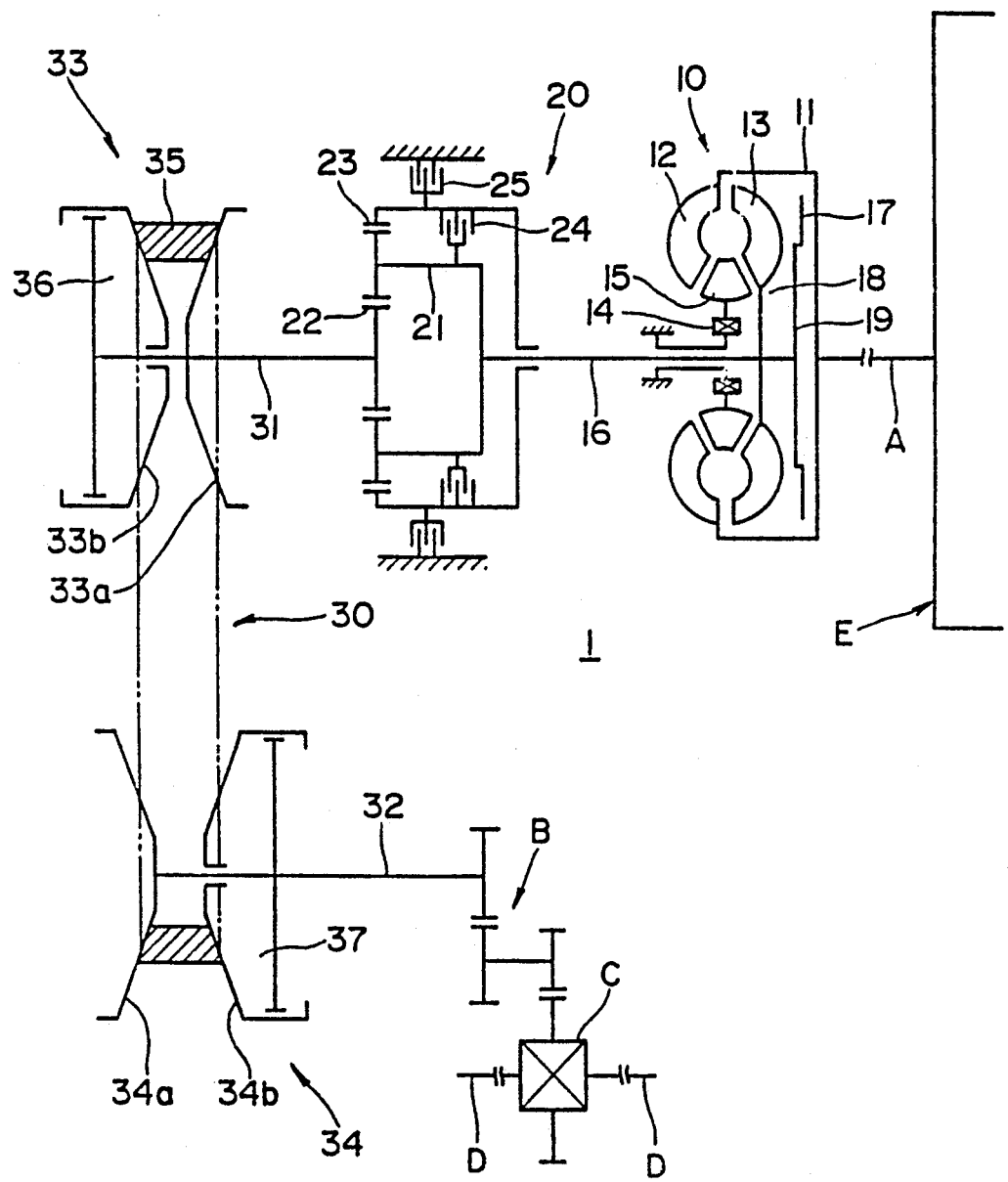
FIG. 1 is a schematic illustration of a steplessly variable transmission in accordance with the present invention.
Figure 2:
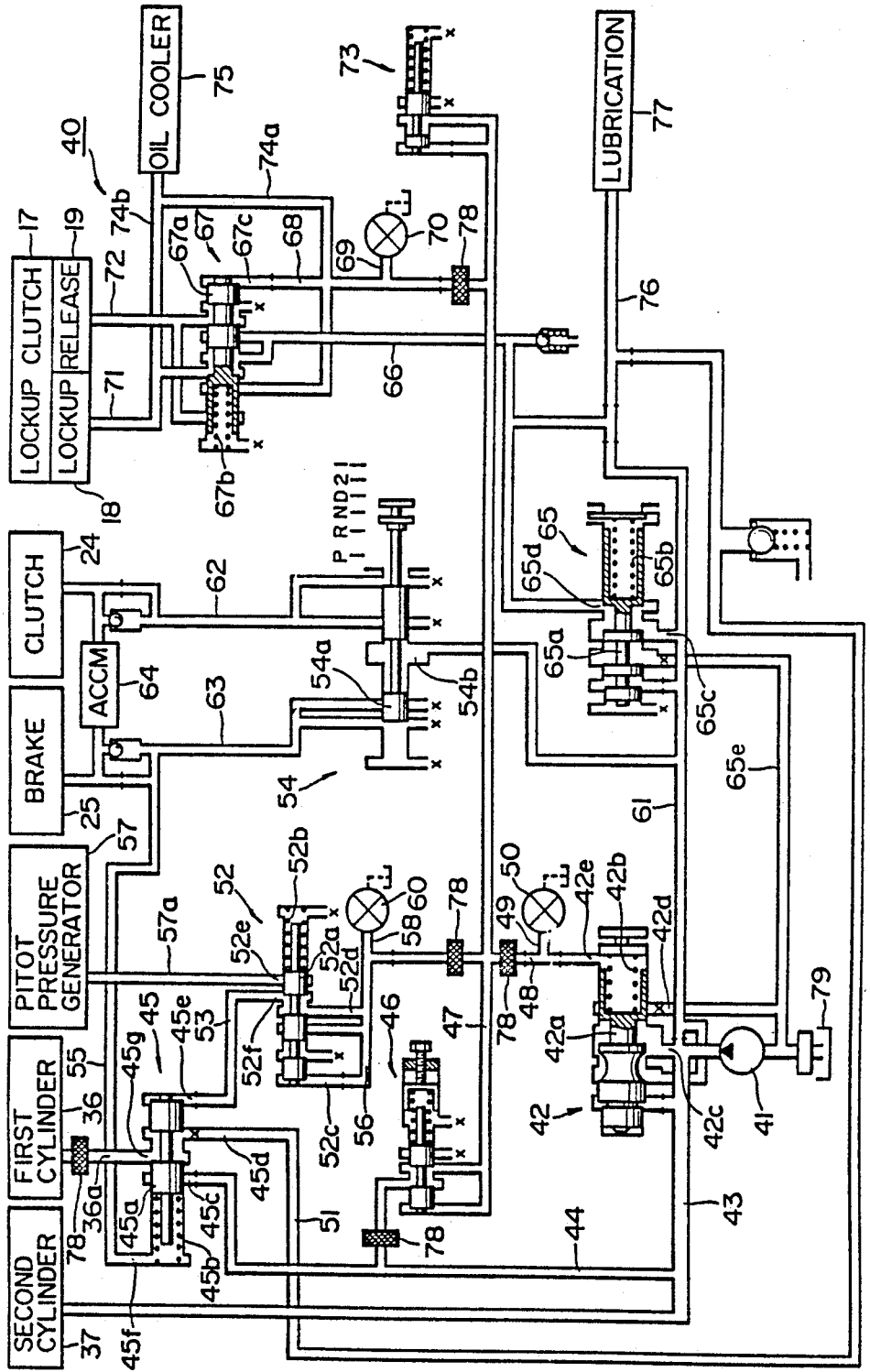
FIG. 2 is a diagrammatical illustration of a hydraulic control circuit for controlling the steplessly variable transmission shown in FIG. 1.
Figure 3:
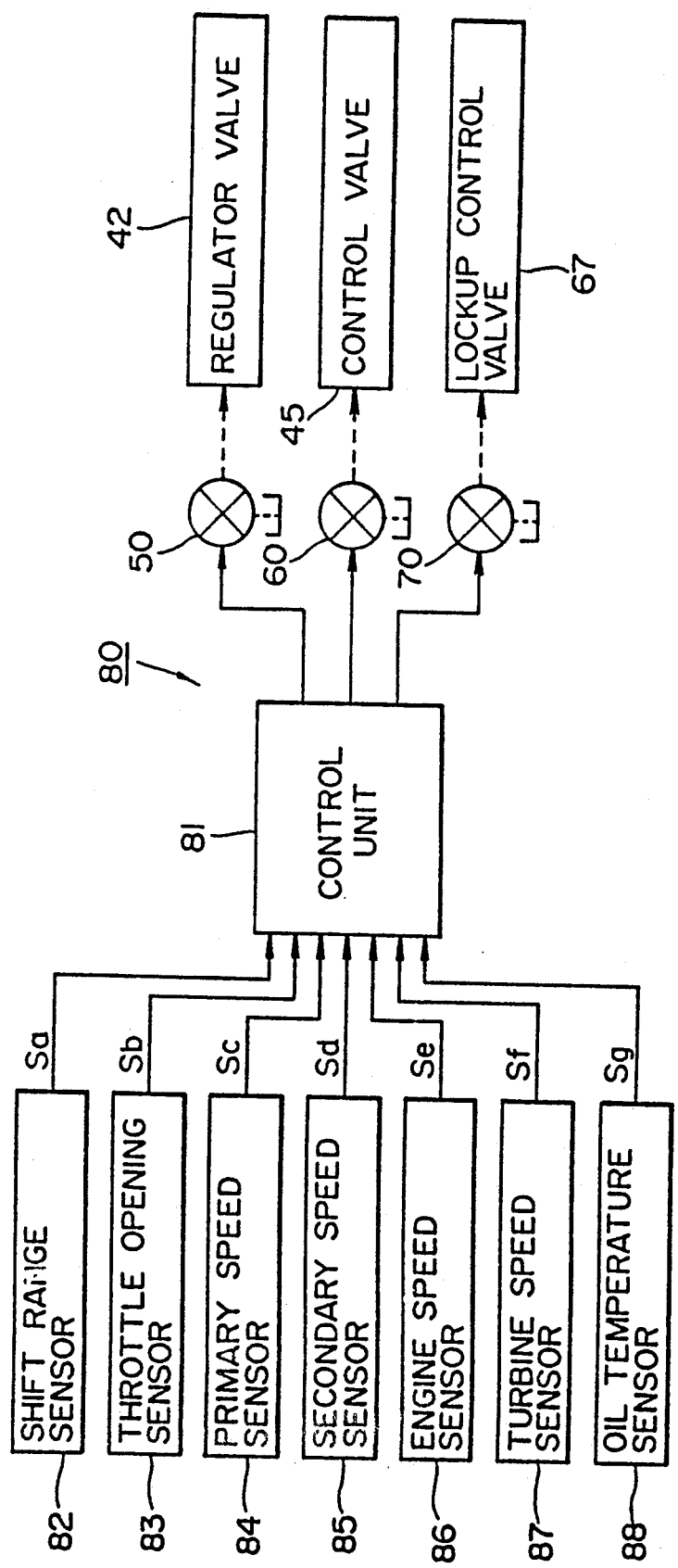
FIG. 3 is a block diagram showing an electric circuit for controlling various valves of the hydraulic control circuit shown in FIG. 2.

Referring to the drawings in detail, particularly to FIGS. 1 to 3, a steplessly variable transmission 1 having a hydraulic control system in accordance with a preferred embodiment of the present invention is shown. The transmission comprises a fluid coupling, in particular a torque converter 10 connected to an output shaft A of an engine E, such as an engine crank shaft, for transmitting engine output either with or without slippage, a forward/reverse shift unit 20 disposed on the output side of of the torque converter 10, and a belt-pulley transmission unit 30 changeably transmitting the engine output transmitted from the torque converter 10 to axles D by means of a gear train B and a differential unit C.

Torque converter 10, which can multiply engine torque, comprises a pair of torus members, a driving torus or pump 12 and a driven torus or turbine 13, placed face to face with a slight clearance therebetween. The two tori 12 and 13 are fastened to shafts: the driving torus or pump 12 to the engine output shaft A and the driven torus or turbine 13 to an output or turbine shaft 16. A thin housing 11 of the torque converter 10 surrounds the turbine 13 and securely holds the pump 12. A stator 15 is mounted between the pump 12 and the turbine 13. To produce stator locking action, a sprag one-way clutch 14 is secured to a casing (not shown) of the steplessly variable transmission 1. As is well known, the housing 11 is filled with a special lightweight oil to transmit engine output from the pump 12 to the turbine 13. The torque converter 10 is further provided with a lockup clutch 17 having a clutch piston (not shown) for either mechanically locking the pump 12 and turbine 13 together or unlocking them, thereby either preventing or allowing some slipping action of the torque converter 10. When transmission fluid flows into a space 19, hereinafter referred to as a release chamber, there is no contact between the housing 11 and a friction surface of the clutch piston of the lockup clutch 17. The pump 12 and the turbine 13 are accordingly free from each other and drive is provided through the fluid. On the other hand, when transmission fluid flows into a space 18, hereinafter referred to as a lockup chamber, between the turbine 13 and the lockup clutch 17, lockup conditions are present. The lockup clutch 17 moves, engaging the friction surface of the clutch piston of the lockup clutch 17 with the housing 11 to lock up or directly couple the pump 12 and the turbine 13 together.

Forward/reverse shift unit 20 mainly consists of a compact planetary gearset that is disposed between the torque converter 10 and the belt-pulley transmission unit 30. A pinion carrier 21 of the planetary gearset is connected to the turbine shaft 16 of the torque converter 10 and a sun gear 22 of the planetary gearset is connected to an input shaft 31 of the belt-pulley transmission unit 30. The forward/reverse shift unit 20 is provided with a clutch 24 interposed between the pinion carrier 21 and a ring gear 23 of the planetary gearset. A brake 25 is interposed between the ring gear 23 of the planetary gearset and the casing of the steplessly variable transmission 1. Because of the clutch 24 and brake 25 thus incorporated in the planetary gearset, the engine output transmitted from the output shaft A of the engine E and then the torque converter 10 is connected to or cut off from the belt-pulley transmission unit 30. That is, the rotation of the engine E transmitted from the output shaft A and the torque converter 10 is either connected to an input shaft 31 of the belt-pulley transmission unit 30 when the clutch 24 is locked but the brake 25 is released or reversed and connected to the same when the clutch 24 is unlocked but the brake 25 is locked.

Belt-pulley transmission unit 30 further has an output shaft 32 laterally spaced from and disposed in parallel with the input shaft 31 thereof. Associated with the input and output shafts 31 and 32, respectively, are driving or primary and driven or secondary pulley assemblies 33 and 34 rotationally coupled together by an endless V-belt 35. The primary pulley assembly 33 comprises a stationary pulley flange or disc 33a and a movable pulley flange or disc 33b arranged coaxially in face-to-face fashion, each having a generally frustoconical configuration. The stationary pulley disc 33a is fastened to the input shaft 31; the movable pulley disc 33b is slidably mounted on the the input shaft 31 to move axially closer to or away from the stationary pulley disc 33a so as thereby to decreasingly or increasingly vary the distance between the stationary and movable pulley discs 33a and 33b. As the distance between the stationary and movable pulley discs 33a and 33b changes, the primary pulley assembly 33 changes in effective diameter.

Secondary pulley assembly 34 is substantially the same in structure and operation as the primary pulley assembly 33 and comprises a stationary pulley flange or disc 34a fastened to the output shaft 32 and a movable pulley flange or disc 34b slidably mounted on the output shaft 32 to move axially closer to or away from the stationary pulley disc 34a so as thereby to decreasingly or increasingly vary the distance between the stationary and movable pulley discs 34a and 34b and accordingly the effective diameter of the secondary pulley assembly 34. For causing the movable pulley discs 33b and 34b to move axially, complementarily in opposite directions, there are provided first and second hydraulic cylinders 36 and 37 cooperating with the movable pulley discs 33b and 34b, respectively. The first and second hydraulic cylinders 36 and 37 are operationally correlated and actuated simultaneously in such a way as to move the movable pulley discs 33b and 34b so as to inversely vary the effective diameter of the primary and secondary pulley assemblies 33 and 34. In more detail, if the first hydraulic cylinder 36 is filled with fluid to thereby displace the movable pulley disc 33b axially toward the stationary pulley disc 33a, the effective diameter of the primary pulley assembly 33 is increasingly varied. Upon this displacement of the first hydraulic cylinder 36, fluid is discharged from the second hydraulic cylinder 37 so as to displace the movable pulley disc 34b axially away from the stationary pulley disc 34a, decreasingly varying the effective diameter of the secondary pulley assembly 34 complementarily to the increase of effective diameter of the primary pulley assembly 33. In this way, the belt-pulley transmission unit 30 increasingly or decreasingly changes itself in transmission ratio. It is to be noted that line pressure supplied to the second hydraulic cylinder 37 is controlled according to the engine output and the transmission ratio of the belt-pulley transmission unit 30, so that the endless V-belt 35 is in tension and the belt-pulley transmission unit 30 transmits a necessary torque.

Lockup clutch 17 of the torque converter 10, the clutch 24 of the forward/reverse shift unit 20 and the first and second hydraulic cylinders 36 and 37 of the belt-pulley transmission unit 30 are actuated and controlled by means of respectively associated actuators, such as hydraulic valves, whose action is controlled by a control system consisting of a hydraulic control circuit 40 shown in detail in FIG. 2. As shown, the hydraulic control circuit 40 includes a hydraulic pump 41 operated by the engine E of the automotive vehicle in a well known manner. The hydraulic pump 41 pumps and delivers fluid or oil into the hydraulic control circuit 40. The oil spouted from the hydraulic pump 41 first flows into a regulator valve 42 and is regulated thereby so as to develop a certain line pressure in a main pressure line 43. The line pressure thus regulated is delivered into the second hydraulic cylinder 37 of the secondary pulley assembly 34 through the main pressure line 43. The main pressure line 43 branches off into a control pressure line 44 to connect the line pressure in the main pressure line 43 to the first hydraulic cylinder 36 of the belt-pulley transmission unit 30 through a control valve 45 for transmission ratio control.

Regulator valve 42 has a spool 42a and a return spring 42b for urging or forcing the spool 42a in a direction of the axis of the spool 42a towards the left as viewed in FIG. 2. The regulator valve 42 is formed with a pressure inlet port 42c and a drain port 42d axially displaced from the pressure inlet port 42c at the middle thereof. The control pressure line 44 branches off into a reduced pressure line 47 with a reducing valve 46 disposed therein which is connected to a pilot pressure inlet port 42e of the regulator valve 42 by way of a pilot pressure line 48. The spool 42a of the regulator valve 42 receives the line pressure in the main pressure line 43 at one end thereof and a pilot pressure in the pilot pressure line 48 at the other end thereof opposite to the one end.

The pressure reducing valve 46 reduces control pressure from the control pressure line 44. The pilot pressure line 48 branches off into a drain line 49, which is relatively short in length, provided with a first duty solenoid valve 50 whose structure will be described in detail later. The first duty solenoid valve 50 periodically operates to open at a duty rate so as to regulate a pilot pressure in the pilot pressure line 48 to be delivered to the regulator valve 42 according to the duty rate. Pilot pressure is exerted on the spool 42a and forces it to displace in the same direction as it is forced by the return spring 42b. The spool 42a is displaced in either direction according to the difference between line pressure and pilot pressure exerted on both ends of the spool 42a in opposite directions, whereby the pressure inlet port 42c of the regulator valve 42 is connected to or disconnected from the drain port 42d so as to regulate the line pressure in the main pressure line 43 depending upon pilot pressure in the pilot pressure line 48. Thus, the line pressure in the main pressure line 43 is regulated corresponding to the duty rate at which the first duty solenoid 50 is operated.

Transmission ratio control valve 45, which is disposed in the control pressure line 44 for actuating the first hydraulic cylinder 36 for the primary pulley assembly 33 so as to vary the transmission ratio of the belt-pulley transmission unit 30, has a spool 45a and a return spring 45b for urging or forcing the spool 45a in a direction of the axis of the spool 45a towards the right as viewed in FIG. 2. The transmission ratio control valve 45 is formed at the middle with a control pressure inlet port 45c and a drain port 45d axially displaced from each other. The control pressure inlet port 45c is connected to the control pressure line 44; the drain port 45d is connected to a drain line 51. As the spool 45a is displaced in either direction according to the difference between pressures exerted on both ends thereof, either the control pressure inlet port 45c or the drain port 45d is selectively communicated with a control pressure outlet port 45g connected to the first hydraulic cylinder 36 for the primary pulley assembly 33 by way of the control pressure line 36a.

To move the spool 45a against the return spring 45b, the transmission ratio control valve 45 is further provided with a pilot pressure inlet port 45e formed at one end thereof to which a pilot pressure changing valve 52 is connected by way of a pilot pressure line 53 and a pressure reverse port 45f formed at the other end thereof to which a manually operated shift valve 54 is connected by way of a reverse pressure line 55.

Pilot pressure changing valve 52 has a spool 52a and a return spring 52b for urging or forcing the spool 52a in a direction of the axis of the spool 52a towards the left as viewed in FIG. 2. The pilot pressure changing valve 52 is formed at one end with a pressure inlet port 52c, at the middle with first and second pilot pressure inlet ports 52d and 52e axially displaced from each other, and at the other end with a pilot pressure outlet port 52f. The pressure inlet port 52c and the first pilot pressure inlet port 52d are communicated with each other by way of a pilot pressure line 56 into which the reduced pressure line 47 branches off. The second pilot pressure inlet port 52e is connected to a Pitot pressure generator 57 generating a Pitot pressure corresponding to the speed of the engine E by way of a Pitot pressure line 57a. The pilot pressure outlet port 52f is connected to the pilot pressure inlet port 45e of the transmission ratio control valve 45 by way of the pilot pressure line 53. The pilot pressure line 56 communicates with a drain line 58 provided with a second duty solenoid valve 60 which is the same in structure and operation as the first duty solenoid 50. The second duty solenoid valve 60 operates periodically to open at a certain duty rate so as thereby to regulate pilot pressure conducted into the pilot pressure changing valve 52 according to the duty rate.

Figure 4A:
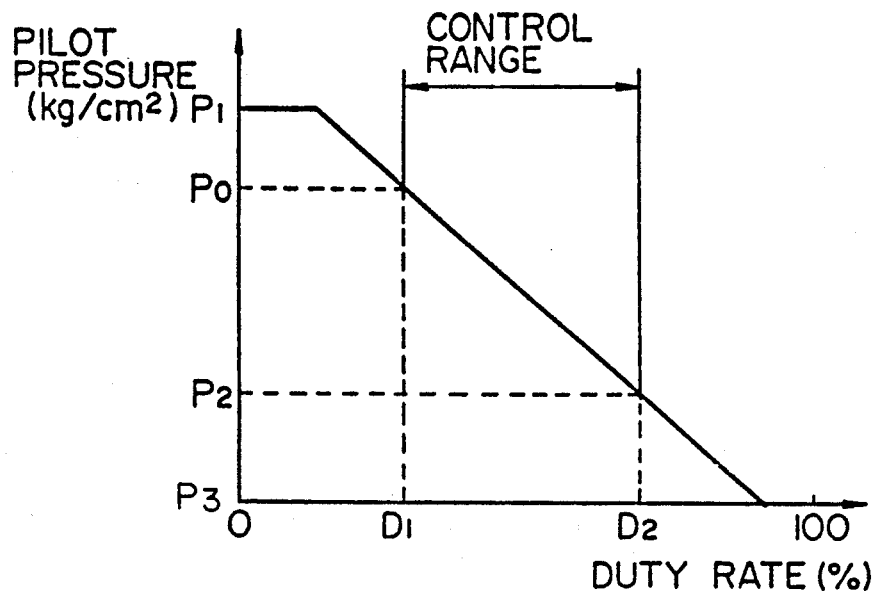
FIGS. 4A and 4B are maps used to determine a duty rate and a target primary speed, respectively.

The second duty solenoid valve 60 operates at a duty rate between zero (0) to 100% to develop pilot pressure ranging from zero to P1 in the pilot pressure line 56 as shown in FIG. 4A.

When the duty rate of the second duty solenoid valve 60 is between D1 and D2 or when a pilot pressure in the pilot pressure line 56 is between P$_o$ and P$_2$, the spool 52a of the pilot pressure changing valve 52 is axially displaced to the left so as to communicate the first pilot pressure inlet port 52d and the pilot pressure outlet port 52f, while shutting off the second pilot pressure inlet port 52e. On the other hand, when the duty rate of the second duty solenoid valve 60 is between zero (0) and D1 or when the pilot pressure in the pilot pressure line 56 is between P$_1$ and P$_o$, the spool 52a is axially displaced all the way to the right against the return spring 52b so as to communicate the second pilot pressure inlet port 52e and the pilot pressure outlet port 52f, while shutting off the first pilot pressure inlet port 52d. In this way, the pilot pressure changing valve 52 selectively communicates either the first pilot pressure inlet port 52d or the second pilot pressure inlet port 52e with the pilot pressure outlet port 52f according to the duty rate of the second duty solenoid valve 60, and hence changes or controls the pilot pressure in the pilot pressure line 56.

Figure 4B:
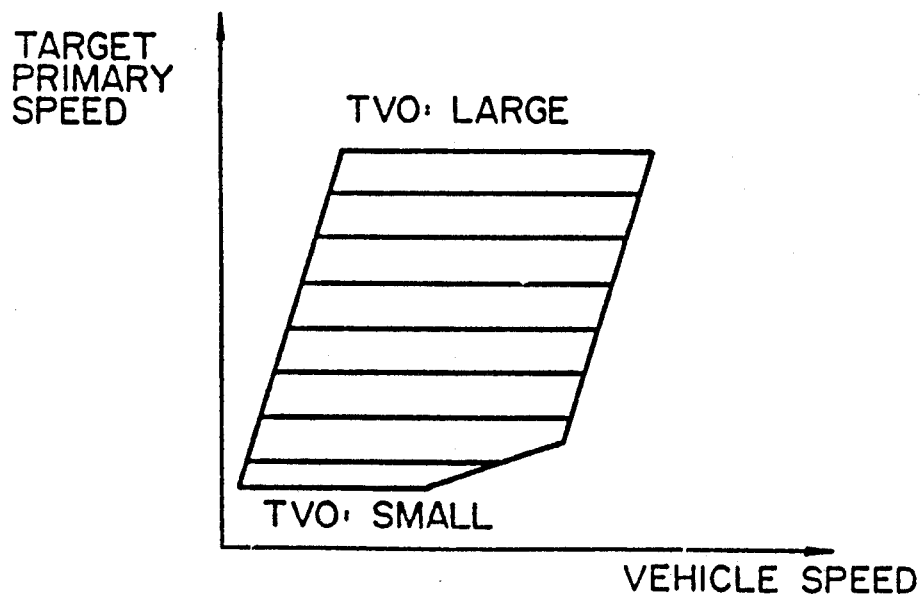

For the control of transmission ratio by the second duty solenoid valve 60, a target transmission ratio is first determined according to the deviation of an actual primary pulley speed from a target primary pulley speed corresponding to operating conditions. The target primary speed of the primary pulley assembly 33 is determined from a target primary speed map drawn up for each shift range of the transmission by using two parameters, vehicle speed (secondary pulley speed) and throttle opening. The target primary speed map is exemplarily shown in FIG. 4B. The duty rate at which the second duty solenoid 60 is operated is feedback controlled in a manner described in detail later so as to vary the pilot pressure in the pilot pressure line 53 to be delivered to the transmission ratio changing valve 45, thereby varying the control pressure delivered to the first hydraulic cylinder 36 of the primary pulley assembly 33 so that the belt-pulley transmission assembly 30 reaches the target speed ratio.

If the second duty solenoid valve 60 accidentally becomes inoperative, or does not open or close, due to failures, such as burn-out, the greatest pilot pressure is induced into the pilot pressure changing valve 52 through the pressure inlet port 52c and acts on the spool 52 to shift it to the right (as viewed in FIG. 2) against the return spring 52b, so as to communicate the Pitot pressure inlet port 52e and the pilot pressure outlet port 52f of the pilot pressure changing valve 52 with each other, thereby allowing a Pitot pressure generated by the Pitot pressure generator 57 in accordance with the speed of the engine E to pass through the pilot pressure changing valve 52 and act on the spool 45a of the transmission ratio control valve 45 so as to shift it to the left (as viewed in FIG. 2) against the return spring 45b. Accordingly, the belt-pulley transmission unit 30 provides a transmission ratio suitable for the operating condition of the engine E.

Drive range shift valve 54 of the hydraulic control circuit 40 is in cooperation with a manual shift lever (not shown) operated by a driver to shift the steplessly variable transmission 1 into desired drive ranges (which are shown by characters D, 1, 2, R, N and P in FIG. 2). The shift valve 54 has a spool 54a axially shiftable in cooperation with the action of the manual shift lever and is formed with a pressure inlet port 54b at the middle thereof to which a pressure line 61 is connected to induce line pressure regulated by the regulator valve 42. When the spool 54a of the shift valve 54 is shifted to one of the forward drive ranges (D, 2 and 1), it communicates the pressure line 61 from the hydraulic pump 41 with a clutch control pressure line 62 connected to the hydraulic driven clutch 24 incorporated in the forward-/reverse shift unit 20 to lockup the hydraulic driven clutch 24, and thereby the steplessly variable transmission 1 shifts itself into the forward drive range.

On the other hand, when the spool 54a is shifted to a reverse position (R), it communicates the the pressure line 61 from the hydraulic pump 41 with a brake control pressure line 63 connected to the hydraulic driven brake 25 incorporated in the forward/reverse shift unit 20 to actuate the brake 25, thereby shifting the steplessly variable transmission 1 to the reverse range (R). When the forward/reverse changing unit 20 selects the reverse range (R), brake control pressure in the brake control pressure line 63 is introduced into the reverse pressure inlet port 45f of the transmission ratio controlling valve 45 through the pressure line 55 and acts on the spool 45a of the transmission ratio control valve 45 to shift it all the way to the right, so as thereby to communicate the control pressure outlet port 45g connected to the first hydraulic cylinder 36 for the primary pulley assembly 33 through the control pressure line 36a with the drain port 45d connected to the drain line 51. This maintains the primary pulley assembly 33 at the minimum effective diameter, so that the steplessly variable transmission 1 maintains itself at the minimum transmission ratio, and hence at the maximum reduction ratio.

At a park (P) position, or a neutral or idle (N) position, the spool 54a shuts off the clutch control pressure line 62, or the pressure inlet port 54b, so as to communicate the clutch control pressure lines 62 and 63 with the drain ports (x) to release the hydraulic driven clutch 24 and the hydraulic driven brake 25, thereby shifting the steplessly variable transmission 1 to the park or the neutral range.

An accumulator 64 is disposed between the clutch and brake control pressure lines 62 and 63. The accumulator 64 is for the mitigation of hydraulic pressure applied to or relieved from the hydraulic driven clutch 24 and the hydraulic driven brake 25 so as to prevent the impact of pressure on the hydraulic driven clutch 24 and the hydraulic driven brake 25 upon the operation of the forward/reverse changing unit 20 between the forward and reverse ranges.

Hydraulic control circuit 40 has another regulator valve 65 for regulating the line pressure regulated by the regulator valve 42 so as to create a lockup clutch control pressure for the lockup clutch 17. The regulator valve 65 has a spool 65a and a return spring 65b urging or forcing the spool 65a in one direction and is formed with a pressure inlet port 65c connected to the regulator valve 42 by way of the pressure line 61 and a regulated pressure outlet port 65d adjacent to the pressure inlet port 65c. The regulator valve 65 is communicated with a lockup clutch control valve 67 by way of a pressure line 66 and with an oil tank 79 by way of a drain line 65e.

Lockup clutch control valve 67 has a spool 67a and a return spring 67b urging or forcing the spool 67a in one direction and is formed with a pilot pressure inlet port 67c connected with a pilot pressure line 68 which extends from the reduced pressure line 47 and is provided with a pressure line extension 69 connected to a third duty solenoid valve 70. Pilot pressure regulated by the third duty solenoid valve 70 actuated at a certain duty rate acts on one end of the spool 67a and shifts it against the return spring 67b. When the spool 67a of the lockup clutch control valve 67 is shifted to the left as shown in FIG. 2 against the return spring 67b, the pressure line 66 and a lockup pressure line 71 are communicated with each other so as to induce control pressure regulated by the regulator valve 65 into the lockup pressure chamber 18 of the lockup clutch, thereby locking the lockup clutch 17 of the torque converter 10. On the other hand, when the spool 67a of the lockup clutch control valve 67 is shifted or returned under the force of the return spring 67b to the right by relieving the pilot pressure, the spool 67a shuts off the lockup pressure line 71 and communicates the pressure line 66 and a release pressure line 72 with each other so as to induce control pressure regulated by the regulator valve 65 into the release pressure chamber 18 of the lockup clutch, thereby unlocking the lockup clutch 17 of the torque converter 10 while relieving the control pressure from the lockup pressure chamber 18.

Hydraulic control circuit 40 is further provided with a relief valve 73 at the end of the pressure line 47, an extension pressure line 76 branching off into the various valves from a lubrication system 77 for lubrication, an oil cooler 75 connected to the lockup clutch control valve 67 through a supply line 74a and a drain line 74b, and oil filters 78 appropriately located at several positions.

Figure 5:
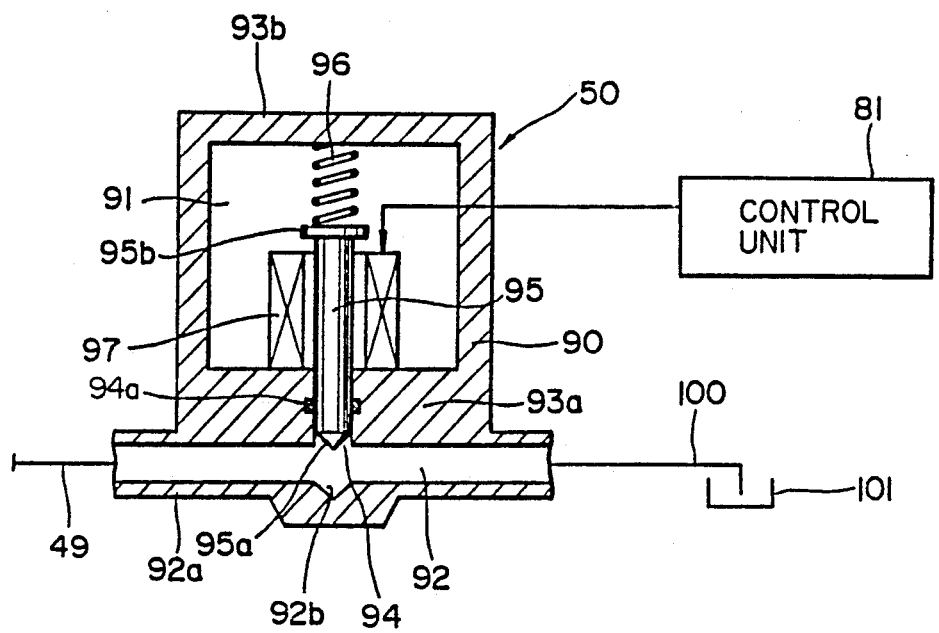
FIG. 5 is a cross-sectional view of a first duty solenoid valve.

Referring to FIG. 5, the first duty solenoid valve 50, which has the same structure as the second and third duty solenoid valves 60 and 70, is shown in detail. As shown, the first duty solenoid valve 50 has a watertight valve housing 90 formed with a valve chamber 91 and a hydraulic fluid passage 92 divided by a bottom wall 93a. The hydraulic fluid passage 92 is connected to a pressure line extension formed by drain line 49 extending from the pilot pressure line 48 at one end and to a relief line 100 communicated with a reservoir tank 101 at the other end. The valve housing 90 of the first duty solenoid valve 50 is further formed with a vertical hole 94 penetrating a bottom wall 93a. The bottom wall 93a incorporates a fluid seal ring 94a at the middle of the vertical hole 94. A bottom wall 92a forming the hydraulic fluid passage 92 is formed with a cone-shaped indent 92b.

A plunger piston 95 functioning as a valve rod is slidably received in the vertical hole 94. A cylindrical electromagnetic coil assembly 97, in alignment with the vertical hole 94, causes reciprocating movement of plunger piston 95 between a protruded position where a cone-shaped plunger head 95a of the plunger piston 95 is snugly received in the cone-shaped indent 92b to shut off the hydraulic fluid passage 92 and a retracted position where the plunger piston 95 opens the hydraulic fluid passage 92. A coil spring 96 is disposed between a tail end 95b of the plunger piston 95 and an upper wall 93b of the valve housing 90 to force downwardly the plunger piston 95 towards the protruded position. The control unit 81 controls the cylindrical electromagnetic coil assembly 97 so that it alternately energizes and deenergizes it at a calculated duty rate so as to thrust up or retract the plunger piston against the coil spring 96 and thereby open the hydraulic fluid passage 92 and to allow the plunger to be forced down or protruded by the coil spring and thereby shut off the hydraulic fluid passage 92. It is to be noted that the duty rate of the duty solenoid valve 50 is defined by the ratio $(T_{on}/T_{cy})$ of open time $T_{on}$ of the duty solenoid valve 50 to one cycle of open-to-close time $T_{cy}$.

Referring now to FIG. 3, an electric control circuit 80 is shown, in block diagram form, and includes a control unit 81, which mainly comprises a microcomputer, for controlling the first, second and third duty solenoid valves 50, 60 and 70. The control unit 81 is connected to outputs of various sensors, such as a shifted range sensor 82 for detecting the operated position (D, 1, 2, R, N or P) of the shift lever, a throttle opening sensor 83 for detecting the opening of engine throttle valve TVO, a first speed sensor 84 for detecting the speed of rotation $N_p$ of the primary pulley assembly 33, a second speed sensor 85 for detecting the speed of rotation $N_s$ of the secondary pulley assembly 44 (which is referred to as the speed of vehicle), an engine speed sensor 86 for detecting the engine speed $N_e$ of the engine E, a turbine speed sensor 87 for detecting the speed of rotation $N_t$ of the turbine 13 of the torque converter 10 of the steplessly variable transmission 1, and an oil temperature sensor 88 for detecting the temperature of hydraulic oil $T_o$. These sensors 82 to 88, which are well known in structure and operation and need not be described in detail herein, output appropriate signals $S_a$, $S_b$, $S_c$, $S_d$, $S_e$, $S_f$ and $S_g$, respectively. The control unit 81 controls duty rates for the first to third duty solenoid valves 50, 60 and 70 according to the output signals from the sensors 82 to 87 to perform the adjustment of pilot pressure to be induced into the regulator valve 42, the transmission speed ratio controlling valve 45 and the lockup clutch control valve 67, respectively, so as to control the line pressure to be supplied to the second hydraulic cylinder 37 of the secondary pulley assembly 34 in order to adjust the tension of the V-belt 35 or the ability of transmitting torque of the belt-pulley transmission unit 30, the line pressure to be supplied to first hydraulic cylinder 36 of the primary pulley assembly 33 in order to control the speed ratio of the belt-pulley transmission unit 30, and the operation of the lockup clutch 17.

That is, the control unit 81 is designed to determine the duty rate of a function (f) of the first duty solenoid valve 50 to create line pressure P from the following expression of turbine torque $T_t$ and transmission speed ratio $H_h$:

$$P = f(T_t \times H_h)$$

where
the transmission ratio $H_h$ is defined as a ratio of the speed of rotation $N_p$ of the primary pulley assembly 33 to the speed of rotation $N_s$ of the secondary pulley assembly 34; and
the turbine torque $T_t$ is the product of torque ratio $H_t$ multiplied by the output torque $T_e$ of the engine E.

The engine torque $T_e$ is defined by the speed of rotation $N_e$ and the opening of engine throttle valve TVO. Hence, the line pressure P is defined as the following expression:

$$P = f(T_e \times H_t \times H_h)$$

Figure 6:
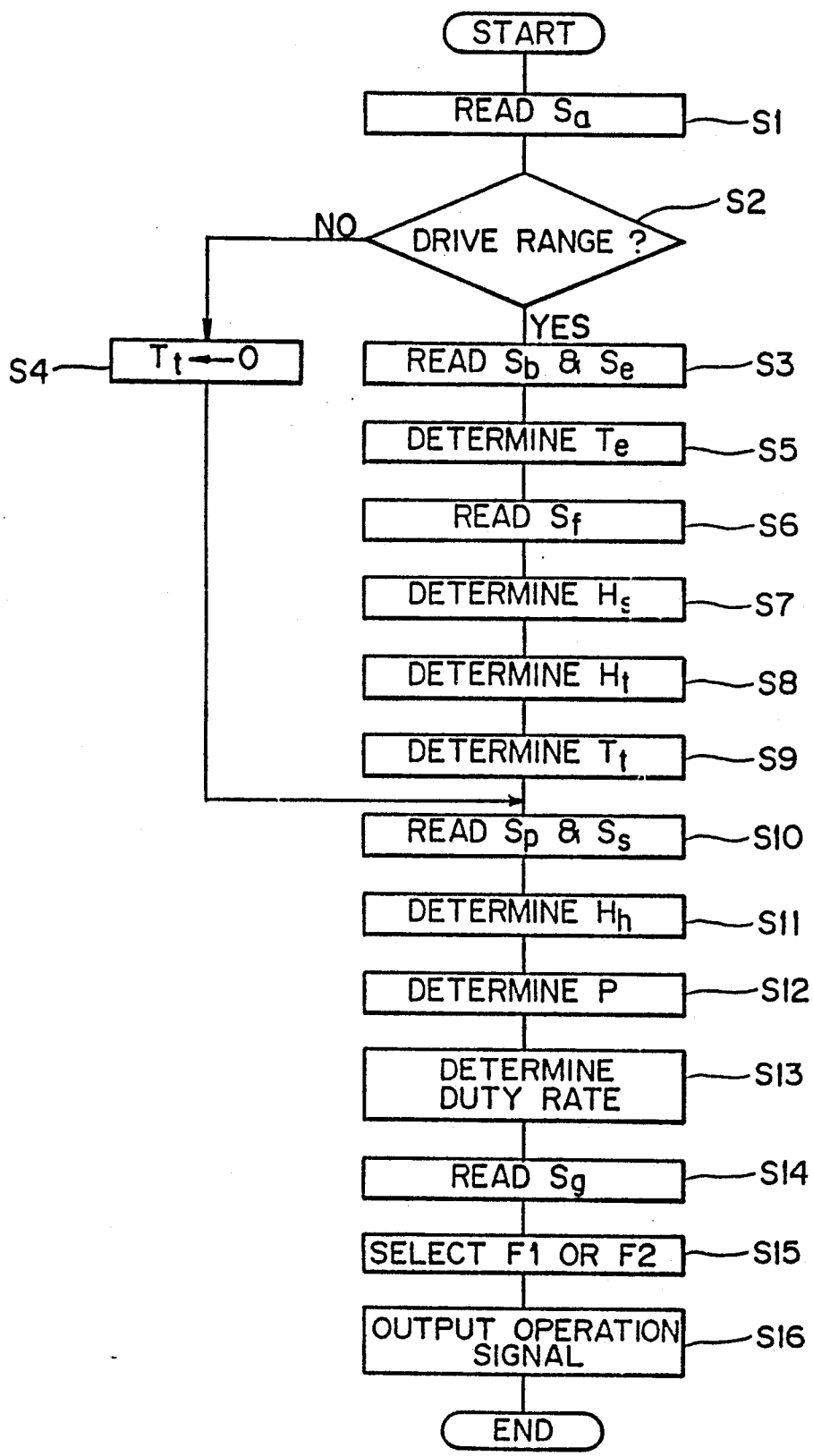
FIG. 6 is a flow chart illustrating a duty solenoid control routine for the control unit.

The operation of the first duty solenoid 50 which is of the most importance in the hydraulic control system of the present invention shown in FIGS. 2 and 5 is best understood by reviewing FIG. 6, which is a flow chart illustrating a general routine for the microcomputer of the control unit 81. Programming a microcomputer is a skill well understood in the art. The following description is written to enable a programmer having ordinary skill in the art to prepare an appropriate program for the microcomputer of the duty control unit 81.

Figure 7A:
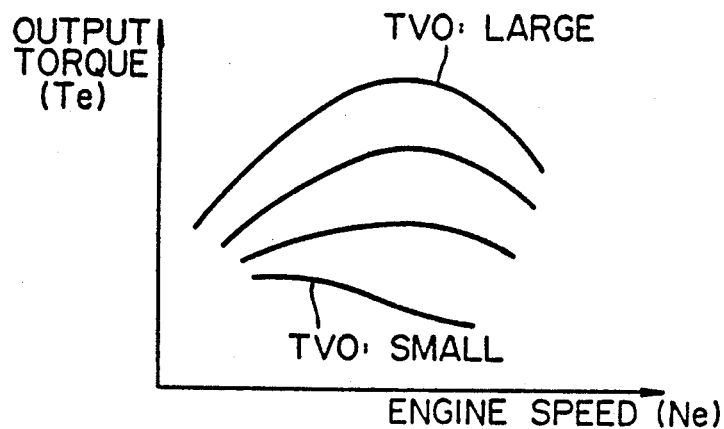
FIGS. 7A to 7E are maps used to determine a frequency at which a signal for operating the duty solenoid valve is provided.

Referring to FIG. 6 showing the general routine, after reading the output signal $S_a$ from the shift range sensor 82 in a step S1, a decision is made in a step S2 to judge whether or not the steplessly variable transmission 1 is in a driving range. If the answer to the decision is yes indicating that the steplessly variable transmission 1 is in one of the forward or reverse driving ranges, namely the reverse (R), drive (D), first (1) or second (2) range, the control unit 81 reads the output signals $S_b$ and $S_e$ from the throttle opening sensor 83 and the engine speed sensor 86 to detect the throttle opening TVO of the throttle valve and the speed of rotation $N_e$ of the engine E in a step S3. Based on the throttle opening TVO of the throttle valve and the speed of rotation $N_e$ of the engine E, an output torque $T_e$ of the engine E is determined by taking reading on a given map shown in FIG. 7A in a step S5.

Figure 7B:
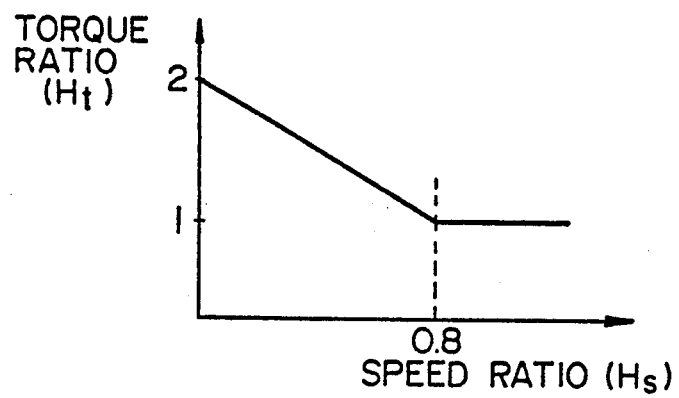

Following the determination of output torque $T_e$, the output signal $S_f$ from the turbine speed sensor 87 is read to determine the speed of rotation $N_t$ of the turbine 13 which is defined as an output speed of rotation of the torque converter 10 in a step S6. Based on the output speed of rotation $N_t$ of the torque converter 10 and the speed of rotation $N_e$ of the engine E determined as above, a speed ratio $H_s$ is determined by computing $N_t$ (turbine speed)/$N_e$ (engine speed) in a step S7. A torque ratio $H_t$ is determined based on the speed ratio $H_s$ by taking reading on a given map shown in FIG. 7B in a step S8. As apparent from the given map, torque ratio $H_t$ of the torque converter 10, which takes a maximum value of two (2) at a speed ratio $H_s$ of zero (0) while the vehicle stops, gradually. decreasingly changes to a value of one (1) with gradual increase of speed ratio $H_s$ to approximately 0.8 and is maintained at a value of one (1) for speed ratios $H_s$ over 0.8. Input torque $T_t$ delivered to the belt-pulley transmission unit 30 is computed from $T_e$ (engine output torque)$\times H_t$ (torque ratio) in a step S9.

If the answer to the decision regarding driving range in the step S2 is no, indicating that the steplessly variable transmission 1 is in a non-driving range, namely the park (P) or the neutral (N) range, the control unit 81 automatically sets input torque $T_t$ to the belt-pulley transmission unit 30 to a value of zero (0) independently of the output torque $T_e$ of the engine E and the torque ratio $H_t$ of the torque converter 10 in a step S4.

Either after computing input torque $T_t$ in the step S9 or after setting input torque $T_t$ tp a value zero (0) in the step S4, the control unit 81 reads the output signals $S_c$ and $S_d$ from the primary and secondary pulley speed sensors 84 and 85 to determine the speeds of rotation $N_p$ and $N_s$ of the primary and secondary pulley assemblies 33 and 34, respectively, in a step S10. Then, a transmission ratio $H_h$ is computed from $N_p$ (primary speed)/$N_s$ (secondary speed) in a step S11.

Figure 7C:
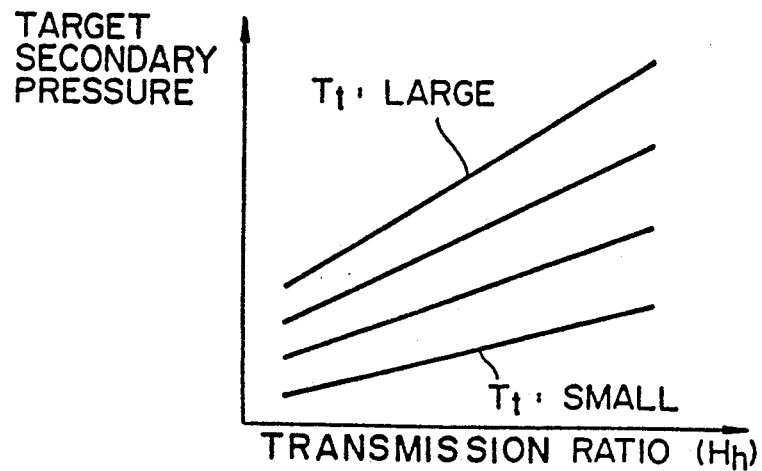
Figure 7D:
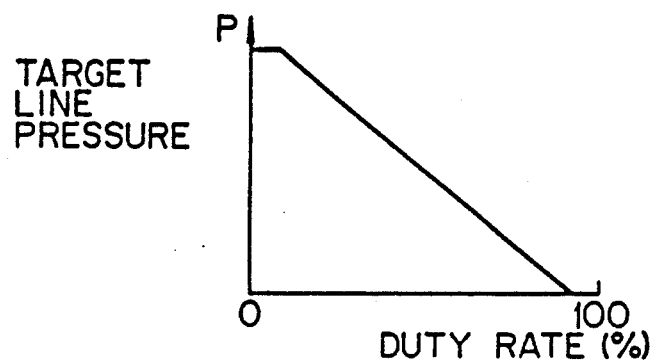

Following these computations, a target secondary pressure, which is a target line pressure P in the main pressure line 43 to be applied to the second hydraulic cylinder 37 of the secondary pulley assembly 34, is drawn from a given map shown in FIG. 7C based on the computed input torque $T_t$ and transmission ratio $H_h$ in a step 12. In a step S13, a duty rate at which the first duty solenoid valve 50 should be operated to develop the target line pressure P in the main pressure line 43 drawn from the map shown in FIG. 7C is determined by taking a reading from a duty rate control map shown in FIG. 7D. As apparent the duty solenoid control map shown in FIG. 7D, the greater the target line pressure P, the smaller the duty rate to be determined for the first duty solenoid valve 50 is. That is, the greater the determined duty rate, the greater the open time of the duty solenoid valve 50 is relative to one cycle of open-to-close time so that the quantity of oil drained through the pilot pressure line 48 for the regulator valve 42 and the drain line 49 becomes large. Accordingly, if the target line pressure P is lower, the first solenoid valve 50 is operated at a higher duty rate, thereby dropping pilot pressure induced into the regulator valve 42 so as to increase the quantity of drainage of oil through the pilot pressure line 48 and the drain line 49, causing the regulator valve 42 to drop the line pressure P in the main pressure line 43. Conversely, if the target line pressure P is higher, the first solenoid valve 50 is operated at a lower duty rate, thereby raising pilot pressure induced into the regulator valve 42 so as to decrease the quantity of drainage of oil through the pilot pressure line 48 and the drain line 49, causing the regulator valve 42 to raise the line pressure P in the main pressure line 43.

After the determination of duty rate for the first solenoid valve 50 necessary to develop the target line pressure P in the step S13, the control unit 81 reads the output signal $S_g$ from the oil temperature sensor 88 to determine the temperature of oil $T_o$ in a step S14. Then, the control unit 81 determines or selects a frequency F on which a steady operation signal having the duty rate for the first duty solenoid valve 50 is provided in step S15. The determination of frequency F is carried out based on a frequency selection map shown in FIG. 7E established in accordance with target line pressure P, engine speed $N_e$ and the temperature of oil $T_o$. The frequency selection map defines high and low frequency zones $H_f$ and $L_f$ divided by a border-line I (which is referred to as a lower temperature border-line I) for temperatures $T_o$ of oil lower than a critical temperature of, for example, approximately 100° C. or a border-line II (which is referred to as a higher temperature border-line II) for temperatures $T_o$ of oil higher than the critical temperature. If the temperature of oil $T_o$ is lower than the critical temperature of approximately 100° C., the control unit 81 selects a lower frequency F1 of, for example, 33 Hz (shown in FIG. 7F) when both of the target line pressure P and the engine speed $N_e$ fall in the lower frequency zone $L_f$ defined by the lower temperature border-line I or a higher frequency F2 of, for example, 100 Hz (shown in FIG. 7F) when they fall in the high frequency zone $H_f$ defined by the lower temperature border-line I. Similarly, if the temperature of oil $T_o$ is higher than the critical temperature of approximately 100° C., the control unit 81 selects the lower frequency F1 of 33 Hz when both of the target line pressure P and the engine speed $N_e$ fall in the low frequency zone $L_f$ defined by the higher temperature border-line II or the higher frequency F2 of 100 Hz when they fall in the high frequency zone $H_f$ defined by the higher temperature border-line II.

Figure 7E:
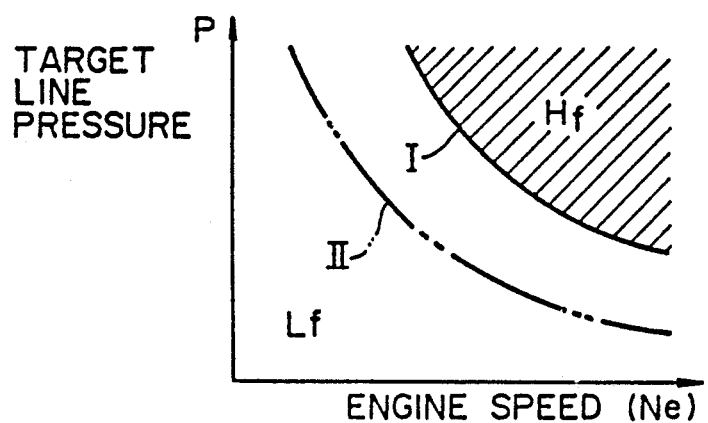
Figure 7F:
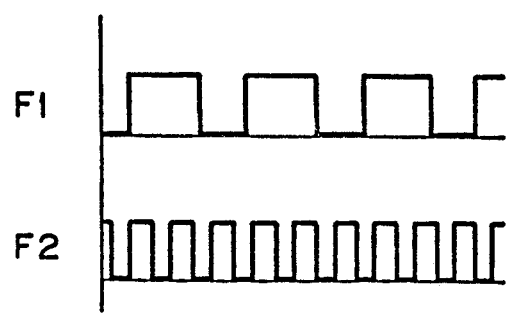
FIG. 7F represents signals at high and low frequencies.

As apparent from FIG. 7E, the high temperature border-line II extends in the low frequency zone $L_f$ defined by the low temperature border-line I. Accordingly, when the speed of rotation $N_e$ of the engine E and the target line pressure P are relatively high, the duty solenoid valve 50 is operated on the higher frequency F2 of 100 Hz in an expanded wide range of operating conditions when oil temperature is high.

Finally, the control unit 81 outputs a steady operating signal having the duty rate on a selected frequency F1 or F2 to the first duty solenoid valve 50 in a step S16.

In this way, the line pressure P in the main pressure line 43 is regulated by the regulator valve 42 correspondingly to the duty rate at which the first duty solenoid valve 50 is operated.

Figure 8A:
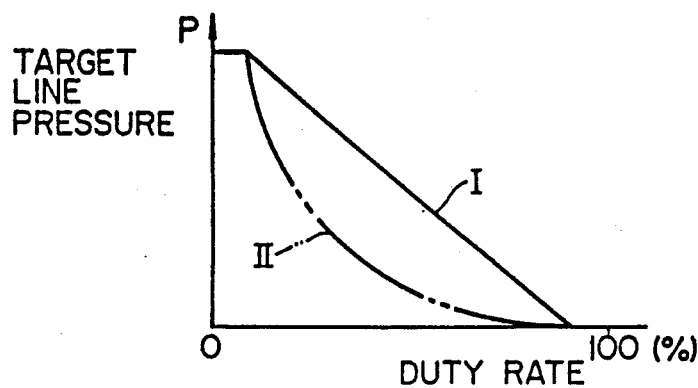
FIGS. 8A and 8B are maps used to determine a frequency at which a signal for operating the duty solenoid valve is provided.
Figure 8B:
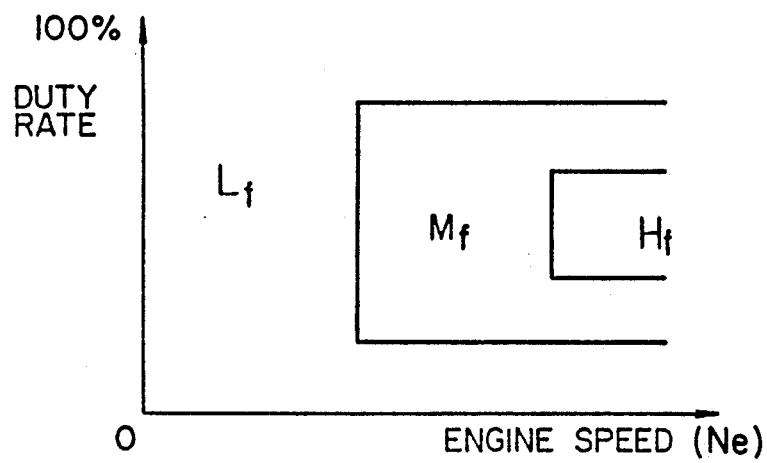
Figure 8C:
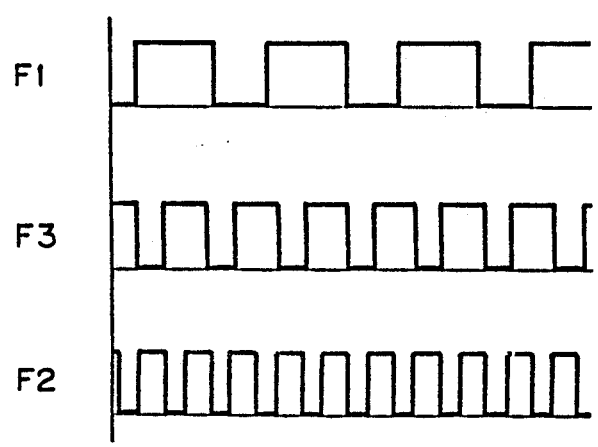
FIG. 8C is a schematic representation of signals at high, middle and low frequencies.

Referring now to FIGS. 8A to 8C, variants of maps for the determination of duty rate and the assignment of frequency are illustrated. Before the determination of duty rate for the first solenoid valve 50, to develop a target line pressure P in the step S13, the control unit 81 reads the output signal $S_g$ from the oil temperature sensor 88 to determine the temperature of oil $T_o$. A duty rate at which the first duty solenoid 50 is operated is drawn on a duty rate control map as shown in FIG. 8A. A duty rate is determined according to a target line pressure P to be developed in the main pressure line 43 by taking a reading on a high temperature duty rate control line I when the temperature of oil is higher than a critical temperature of approximately 100° C. or on a low temperature duty rate control line II when the temperature of oil is lower than the critical temperature.

Then, the control unit 81 determines or assigns a frequency F at which a steady operation signal having the duty rate thus determined for the first duty solenoid valve 50 should be provided. The assignment of frequency F is made by the use of a frequency assigning map shown in FIG. 8B defining three frequency assigning zones, namely a high frequency zone $H_f$, a middle frequency zone $M_f$ and a low frequency zone $L_f$. The control unit 81 assigns a lower frequency F1 of, for example, 33 Hz for an operation signal when the previously determined duty rate and the operating engine speed $N_e$ fall in the low frequency zone $L_f$, a middle frequency F3 of, for example, 50 Hz when they fall in the middle frequency zone $M_f$, or a higher frequency F2 of, for example, 100 Hz when they fall in the high frequency zone $H_f$. These frequencies F1, F2 and F3 are illustrated in FIG. 8C.

Because of the three different frequency assigning zones and because the line pressure in the main pressure line 43 is generally slow in response to fluctuations for very high or very row duty rates and therefore, pressure pulsations in the pilot pressure in the pilot pressure line 48 controlled by the first duty solenoid valve 50 not easily propagated to the line pressure even though the first duty solenoid valve 50 is operated at low frequencies, the first duty solenoid valve 50 generally operates at middle and low frequencies and therefore, deterioration in durability of the first duty solenoid valve 50 is greatly suppressed.

Figure 9:
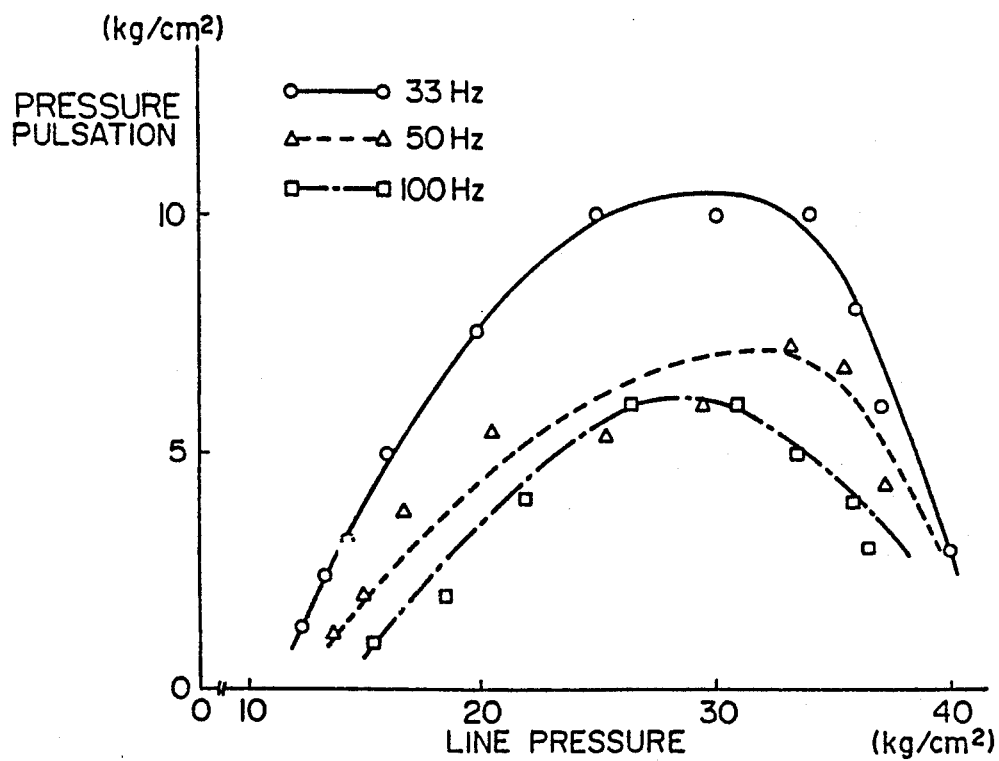
FIG. 9 is a diagram illustrating a result of experiments on the hydraulic control system shown in FIGS. 1 to 3.

FIG. 9 shows the relationship between pressure pulsation and line pressure for the respective frequencies of 33 Hz, 50 Hz and 100 Hz which results from experiments on the hydraulic control system of the present invention at an oil temperature of approximately 72° to 76° C.

It is to be understood that although the invention has been described in detail with respect to a preferred embodiment, nevertheless, various other embodiments and variations are possible which are within the spirit and scope of the invention, and such are intended to be covered by the following claims.

What is claimed is:

1. A hydraulic control system having a hydraulic pump driven by an engine for controlling a transmission of an automotive vehicle comprising:

a regulator valve for regulating a line pressure delivered by said hydraulic pump according to a pilot pressure applied thereto;

a duty solenoid valve for regulating said pilot pressure;

operating means for providing a duty solenoid valve operating signal for operating said duty solenoid valve at a duty rate so that said regulator valve regulates said line pressure to a desired pressure, and frequency changing means for changing a frequency at which said operating means provides said operating signal according to operating conditions of said automotive vehicle, said frequency changing means making said frequency higher when the speed of rotation of said hydraulic pump is high.

2. A hydraulic control system having a hydraulic pump driven by an engine for controlling a transmission of an automotive vehicle comprising:

a regulator valve for regulating a line pressure delivered by said hydraulic pump according to a pilot pressure applied thereto;

a duty solenoid valve for regulating said pilot pressure;

operating means for providing a duty solenoid valve operating signal for operating said duty solenoid valve at a duty rate so that said regulator valve regulates said line pressure to a desired pressure; and frequency changing means for changing a frequency at which said operating means provides said operating signal according to operating conditions of said automotive vehicle, said frequency changing means making said frequency higher when a high line pressure is to be developed by said regulator valve.

3. A hydraulic control system having a hydraulic pump driven by an engine for controlling a transmission of an automotive vehicle comprising:

a regulator valve for regulating a line pressure delivered by said hydraulic pump according to a pilot pressure applied thereto;

a duty solenoid valve for regulating said pilot pressure;

operating means for providing a duty solenoid valve operating signal for operating said duty solenoid valve at a duty rate so that said regulator valve regulates said line pressure to a desired pressure; and frequency changing means for changing a frequency at which said operating means provides said operating signal according to operating conditions of said automotive vehicle, said operating conditions of said automotive vehicle being divided into a plurality of zones based on engine speeds, each said zone assigning a specific frequency.

4. A hydraulic control system having a hydraulic pump driven by an engine for controlling a transmission of an automotive vehicle comprising:

a regulator valve for regulating a line pressure delivered by said hydraulic pump according to a pilot pressure applied thereto;

a duty solenoid valve for regulating said pilot pressure;

operating means for providing a duty solenoid valve operating signal for operating said duty solenoid valve at a duty rate so that said regulator valve regulates said line pressure to a desired pressure; and frequency changing means for changing a frequency at which said operating means provides said operating signal according to operating conditions of said automotive vehicle, said operating conditions of said automotive vehicle being divided into a plurality of zones based on engine speeds and duty rates, each said zone assigning a specific frequency.

5. A hydraulic control system as defined in claim 4, wherein said operating conditions of said automotive vehicle are divided into a high frequency assigning zone, a middle frequency assigning zone and a low frequency assigning zone based on said engine speeds and said duty rates.

6. A hydraulic control system as defined in claim 5, wherein said three zones are determined so that said low frequency assigning zone surrounds said middle frequency assigning zone and said middle frequency assigning zone surrounds said high frequency assigning zone.

7. A hydraulic control system as defined in claim 5, wherein the duty rate at which said duty solenoid valve is operated is greater when a temperature of hydraulic fluid in said hydraulic control system is higher than a critical temperature than when said temperature of hydraulic fluid in said hydraulic control system is lower than said critical temperature.

8. A hydraulic control system having a hydraulic pump driven by an engine for controlling a transmission of an automotive vehicle comprising:

a regulator valve for regulating a line pressure delivered by said hydraulic pump according to a pilot pressure applied thereto;

a duty solenoid valve for regulating said pilot pressure;

operating means for providing a duty solenoid valve operating signal for operating said duty solenoid valve at a duty rate so that said regulator valve regulates said line pressure to a desired pressure; and frequency changing means for changing a frequency at which said operating means provides said operating signal according to operating conditions of said automotive vehicle, said operating conditions of said automotive vehicle being divided into a plurality of zones based on engine speeds and desired line pressures, each said zone assigning a specific frequency.

9. A hydraulic control system as defined in claim 8, wherein said operating conditions of said automotive vehicle are divided into a high frequency assigning zone and a low frequency assigning zone based on engine speeds and desired line pressures.

10. A hydraulic control system as defined in claim 8, wherein a boundary by which said operating conditions are divided into said plurality of zones shifts towards a low engine speed-low line pressure side when a temperature of hydraulic fluid in said hydraulic control system is higher than a critical temperature.

* * * * *